United States Patent [19]
Wrobel

[11] Patent Number: 5,573,322
[45] Date of Patent: Nov. 12, 1996

[54] STORAGE SYSTEM WITH PROTECTIVE SHELVING

[75] Inventor: Keith A. Wrobel, Plymouth, Minn.

[73] Assignee: LSI Corporation of America, Inc., Minneapolis, Minn.

[21] Appl. No.: 529,907

[22] Filed: Sep. 18, 1995

Related U.S. Application Data

[63] Continuation of Ser. No. 195,733, Feb. 14, 1994, abandoned.
[51] Int. Cl.$^6$ .......................... A47B 17/00; A47B 96/00; A47F 5/08
[52] U.S. Cl. ............................... 312/400; 108/27; 211/153
[58] Field of Search ......................... 211/153; 312/140.1, 312/140.3, 408, 400; 108/901, 27, 55.3; 248/241.1

[56] References Cited

U.S. PATENT DOCUMENTS

| | | | |
|---|---|---|---|
| 2,626,846 | 1/1953 | Morris | 108/27 |
| 2,789,874 | 4/1957 | Hammer | 108/27 |
| 2,956,288 | 10/1960 | Nolan | 108/27 X |
| 2,981,580 | 4/1961 | Hansen | 108/27 |
| 3,606,508 | 9/1971 | Burnes | 312/140.3 |
| 3,628,672 | 12/1971 | Heinz | 211/153 |
| 4,308,963 | 1/1982 | Worrallo | 211/153 |
| 4,570,410 | 2/1986 | Tuneke et al. | 108/27 X |
| 4,826,265 | 5/1989 | Hockenberry | 312/326 |
| 5,348,384 | 9/1994 | Hull et al. | 312/140.3 |

Primary Examiner—Peter M. Cuomo
Assistant Examiner—Robert J. Sandy
Attorney, Agent, or Firm—John W. Bunch

[57] ABSTRACT

A storage system (10) incorporates protective shelving (24) of improved construction. The protective shelving (24) includes a semi-rigid overlay (50) covering the top surface and front edges of a rigid undercore (48). The overlay (50) includes a rounded front edge, and raised ribs and alternate grooves extending continuously between the front and rear ends for more strength, resilience and impact resistance.

28 Claims, 2 Drawing Sheets

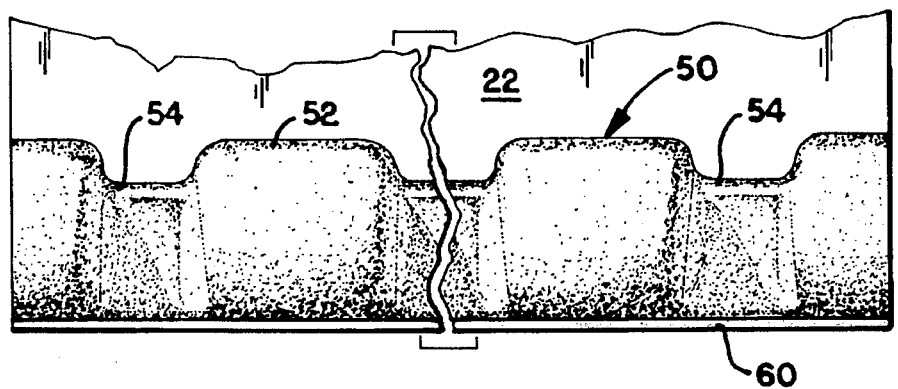
FIG. 4
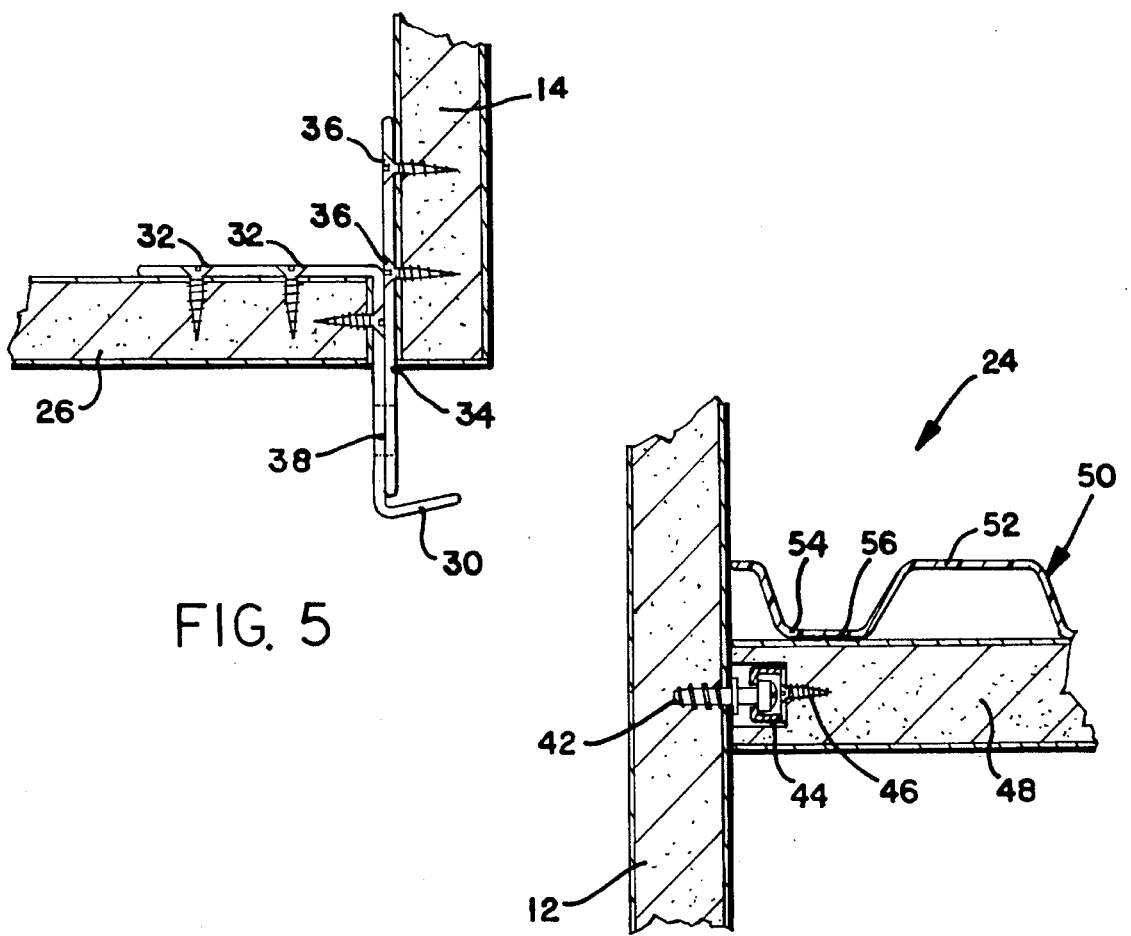
FIG. 5
FIG. 6

STORAGE SYSTEM WITH PROTECTIVE SHELVING

This application is a continuation of application Ser. No. 08/195,733, filed Feb. 14, 1994 now abandoned.

TECHNICAL FIELD

The present invention relates generally to storage and shelving systems. More particularly, this invention concerns a storage system incorporating protective shelving of new and improved construction.

BACKGROUND ART

Various storage and shelving systems have been available heretofore which have been adapted, in one way or another, for storing various objects. The criteria for such storage systems can range the gamut of functional and aesthetic requirements. The shelving in one storage system may be subject to high loading and/or wear, while ventilation may be a requirement in other shelving. Sometimes the front edges of the shelving can be subject to high impact and wear, such as in the case of music instrument storage in a school facility, for example. When not in use, music instruments are typically stored in hard cases, which in turn are stored in lockers in the band room or music department. Protruding metal hardware such as hinges, fasteners and handles are often provided on such cases. The storage of such music cases presents special problems because of the potential damage which can occur to the music case from the shelving, and vice versa. The front edges of the shelving are particularly susceptible to damage in such applications.

Various types of protective shelving have also been available heretofore. Shelving with a metal nose or lip on the leading edge thereof has traditionally been used in such applications. Such shelving resists damage, but because it tends to be rigid and sometimes sharp, it can easily cause damage upon impact with a music case for example. More recently there have been available music instrument storage systems incorporating shelves of molded plastic construction. U.S. Pat. 4,826,265 to Hockenberry is representative of the prior art in this regard. However, while such molded shelves are resilient and more resistant to or from damage, they tend to be somewhat complicated and thus relatively expensive and difficult to manufacture.

There is thus a continuing need for a storage system having improved protective shelving.

SUMMARY OF INVENTION

The present invention comprises an improved storage system which overcomes the foregoing and other difficulties associated with the prior art. In accordance with the invention there is provided protective shelving of improved composite construction combining rigid and a semi-rigid elements for both strength, impact resistance and economy of manufacture. The protective shelving herein incorporates a semi-rigid molded piece of high impact plastic that covers substantially the entire top surface and front edge of an underlying rigid core. The protective cover or overlay piece is of generally corrugated configuration for strength, resilience, and ventilation and/or drainage. The front edge of the molded cover piece is rounded and extends to a point substantially flush with the lower surface of the undercore in order to better distribute impact stresses and avoid being damaged by or causing damage to the object being stored.

BRIEF DESCRIPTION OF DRAWING

A better understanding of the invention can be had by reference to the following Detailed Description in conjunction with the accompanying Drawing, wherein:

FIG. 4 is a front view of the protective shelving herein;

FIG. 5 is a horizontal sectional view showing the latch arrangement of the storage system herein; and FIG. 6 is a sectional view taken along lines 6—6 of FIG. 3 in the direction of the arrows showing the manner in which the protective shelving herein is supported and secured within the storage system.

DETAILED DESCRIPTION

Figure 1:
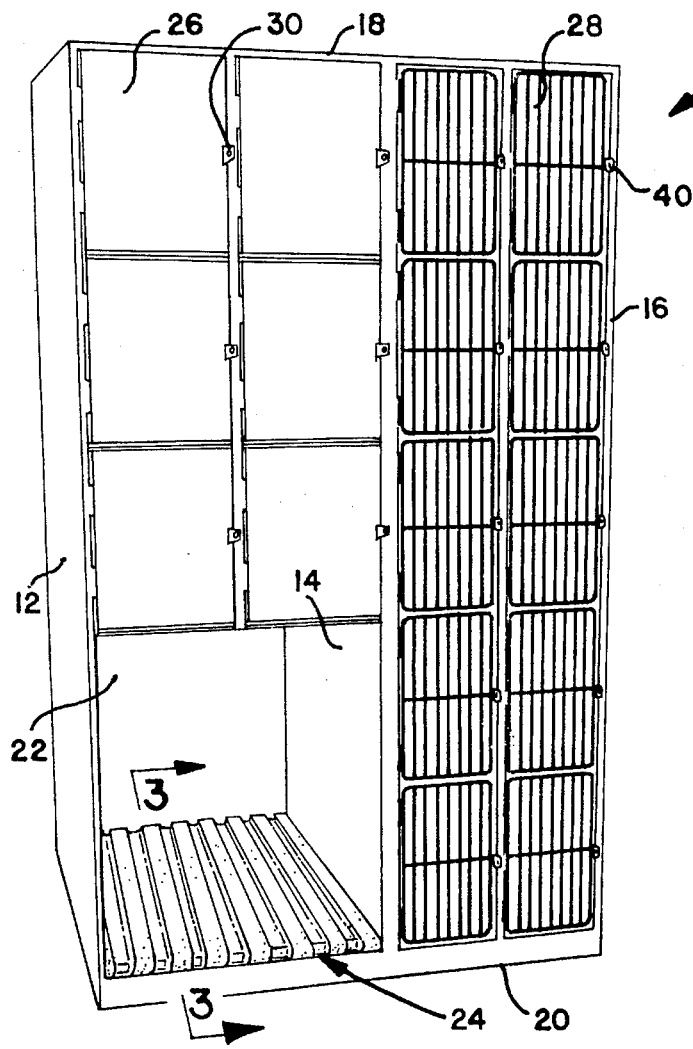
FIG. 1 is a perspective view of a storage system with protective shelving incorporating the invention.

Referring now to the Drawing, wherein like reference numerals designate like or corresponding elements throughout the views, there is shown a storage system 10 incorporating the invention. As will be explained more fully hereinafter, the storage system 10 incorporates unique protective shelving of improved construction.

The storage system 10 includes vertical side walls 12, 14 and 16 interconnected at their top ends by a horizontal top wall 18. The lower ends of the side walls 12, 14 and 16 are interconnected by a bottom wall 20. The rear ends of the side walls 12, 14 and 16 and the rear ends of the top and bottom walls 18 and 20 are interconnected by a vertical back wall 22. In the preferred embodiment, the walls 12 through 22 are formed from laminated particle board material; however, any suitable material can be utilized.

The side walls 12 and 14 and the side walls 14 and 16 are interconnected at vertically spaced intervals by sections of protective shelving 24 to define compartments of the desired number and sizes within the storage system 10. Some of the compartments are closed by hinged doors 26 while others are closed by hinged grilles 28 as shown. Each door 26 preferably includes a handle 30 secured by interior screws 32, and a cooperating hasp 34 secured to the adjacent side wall 14 by interior screws 36 as shown in FIG. 5. The handle 30 and hasp 34 have aligned holes 38 therein for receiving a padlock (not shown) in order to secure the compartment. Similar handles and hasps 40 are provided on the compartments closed by hinged grills 28. If desired, a relatively larger open compartment can be provided in the lower left hand corner of the storage system 10.

Although the storage system 10 is shown with a particular arrangement of open and closed compartments, it will be understood that this is for illustration only and is not critical to practice of the invention. The protective shelving 24 can be used in any desired storage configuration or arrangement. Also, while the present invention is particularly adapted for music instrument storage, the storage system 10 and protective shelving 24 herein can be adapted to many different applications. The particular type of storage application for the protective shelving herein is not critical to practice of the invention.

Each section of protective shelving 24 is preferably supported between the sidewalls 12, 14 and 16 by hidden fasteners. Various such types of fasteners are commercially available, and any suitable type can be used. In the preferred embodiment, such fasteners include a shoulder screw 42 which is secured at one end to the adjacent side wall 12 as shown in FIG. 6. The head at the other end of the shoulder screw 42 fits into a slotted clip 44 which is recessed in a slot routed into the edge of the shelving 24 and secured by two screws 46, only one of which is shown. Such hidden edge fasteners are preferred because they resist tampering and prevent access from adjacent compartments. Two such edge fasteners are provided along each edge of the shelving 24.

Figure 3:
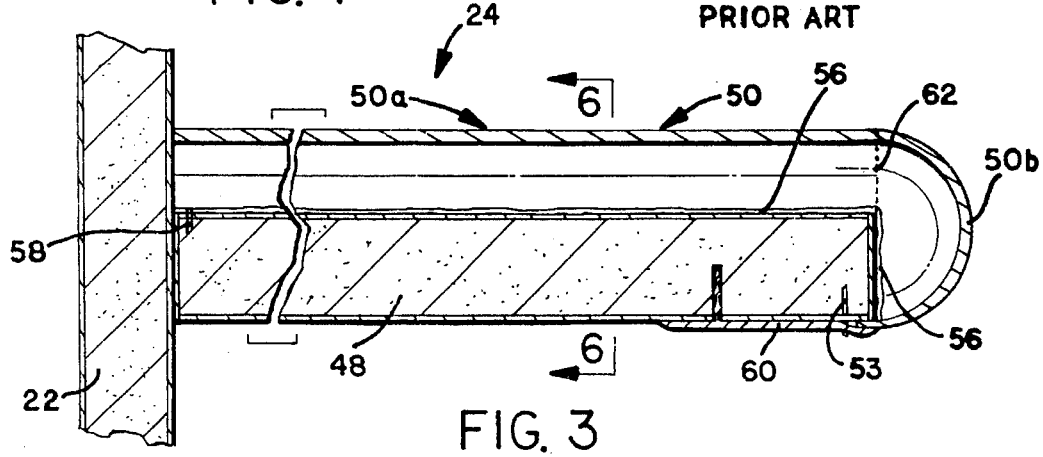
FIG. 3 is a vertical sectional view taken along lines 3—3 of FIG. 1 in the direction of the arrows.

Referring particularly to FIGS. 3 and 4, the constructional details of the protective shelving 24 of the invention can be seen. Each section of protective shelving 24 is of composite construction including a rigid undercore or board 48 and a semi-rigid protective overlay or cover 50 overlying the top and front edges of the board. The board 48 can be formed from any material suitable for supporting the loads to be placed on the shelving 24. In the preferred embodiment, the board 48 is formed from 0.75 inch thick particle board core laminated on at least the top and bottom surfaces. However, the board 48 could also be formed from solid wood, pressed wood, fiber wood or other structurally suitable material.

The protective semi-rigid shield or cover 50 is preferably formed from high-strength, impact-resistant plastic, such as high density polyethylene. The cover 50 is of generally corrugated construction including a generally planar top portion 50a overlying the top surface of the board 48, and a curved front or nose portion 50b overlying the entire front edge of the board. The nose portion is preferably of constant curvature of suitable diameter in accordance with the thickness of board 48, such as about 1.25 inch in the case of 0.75 inch thick board. The protective cover 50 is of generally corrugated configuration including alternating longitudinal ribs 52 and grooves 54 extending continuously between the ends of the cover in a front/back direction relative to the underlying board 48. As best seen in FIG. 4, the ribs 52 and grooves 54 are of generally shallow rectangular cross-section with rounded inside and outside corners in order to provide a smooth contour. The ribs 52 are preferably wider than grooves 54. This smooth configuration also provides more bearing area contact both on the outside top of the shelving 24 as well as between board 48 and cover 50 for better load distribution. The cover 50 is preferably secured to the board 48 by adhesive 52 therebetween, as well as a row of staples 54 at the underside of the front portion 50b and a similar row of staples 58 in the grooves 53 at the rear of the top portion 50a, although any suitable means of fastening may be used.

If desired, an optional trim piece 60 can be provided on the underside of the front edge of shelving 24 for a more finished appearance.

Although the cover 50 is preferably of one-piece integral construction, the cover portions 50a and 50b could be formed from separate pieces, as indicated by dotted line 62 in FIG. 3, the adjacent edges of which could be a butt joint, lap joint, etc.

Figure 2:
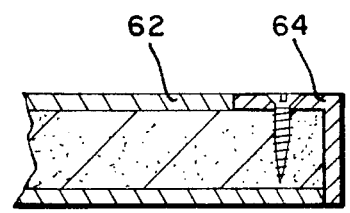
FIGS. 2 and 2A are sectional views illustrating examples of shelves of the prior art.
Figure 2A:
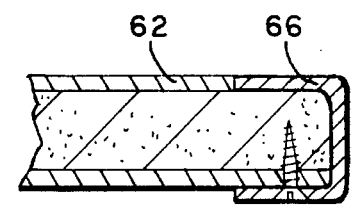

FIGS. 2 and 2A illustrate two examples of shelving with reinforced front edges representative of the prior art. Both are typically formed of tempered hard board 62 over particle board with a sharp metal angle 64 as shown in FIG. 2, or a sharp C-shaped channel 66 as shown in FIG. 2A. Although such prior shelving is relatively resistant to being damaged, it is not resilient and can easily cause damage to items being stored such as music instrument cases.

From the forgoing, it will thus be apparent that the present invention comprises an improved storage system with protective shelving having several advantages over the prior art. The composite construction of the protective shelving herein combines the advantages of both rigid and semi-rigid elements, without requiring complicated or costly manufacturing techniques. Other advantages will be evident to those skilled in the art.

Although particular embodiments of the invention have been illustrated in the accompanying Drawing and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed:

1. A protective shelf for use in a storage system, which comprises:

a generally rectangular, substantially rigid solid undercore having top and bottom surfaces, front and back ends, and left and right longitudinal sides;

said undercore being formed from laminated particle board;

a substantially semi-rigid overlay disposed over said undercore, said overlay having top and bottom surfaces and being relatively thinner than said undercore;

said overlay including a top portion covering the top surface of said undercore and a rounded nose portion covering the front end of said undercore, with alternate longitudinal ribs and longitudinal grooves therein extending substantially continuously between the front and back ends of said undercore; and means for securing the bottom surface of said overlay to the top surface of said undercore at spaced apart predetermined locations.

2. The protective shelf of claim 1, wherein said overlay comprises plastic.

3. The protective shelf according to claim 2, wherein the plastic comprises high density polyethylene.

4. The protective shelf of claim 1, wherein the top portion and nose portion of said overlay are of one-piece, integral construction.

5. The protective shelf of claim 1, wherein the rounded nose portion of said overlay is of constant curvature and terminates at about the junction of the front end and bottom surfaces of said undercore.

6. The protective shelf of claim 1, wherein the ribs and grooves are of generally rectangular cross-section with smooth inside and outside corners, the ribs being relatively wider than the grooves.

7. A protective shelf for use in a storage system, which comprises:

a generally rectangular, substantially rigid solid undercore having top and bottom surfaces, front and back ends, and left and right sides;

a substantially semi-rigid plastic overlay disposed over said undercore, said overlay having top and bottom surfaces and being relatively thinner than said undercore;

said overlay including a top portion covering the top surface of said undercore and a rounded nose portion covering the front end of said undercore, with alternate longitudinal ribs and grooves therein extending substantially continuously between the front and back ends of said undercore;

the ribs and grooves in said overlay being of generally rectangular cross section with rounded inside and outside corners, the ribs being relatively wider than the grooves; and means for securing the bottom surface of said overlay to the top surface of said undercore at spaced apart predetermined locations.

8. The protective shelf of claim 7, wherein said rigid undercore comprises laminated particle board.

9. The protective shelf of claim 7, wherein said overlay comprises high density polyethylene.

10. The protective shelf of claim 7, wherein the rounded nose portion of said overlay terminates at about the junction of the front end and bottom surfaces of said undercore.

11. A protective shelf for use in a storage system, which comprises:

a generally rectangular, substantially rigid undercore having top and bottom surfaces, front and back ends, and left and right longitudinal sides;

said undercore being formed from a predetermined solid material;

a substantially semi-rigid overlay covering said undercore, said overlay having top and bottom surfaces and being relatively thinner than said undercore;

said overlay including a top portion covering the top surface of said undercore and a nose portion covering the front end of said undercore, with alternate longitudinal ribs and longitudinal grooves therein extending substantially continuously between the front and back ends of said undercore; and means for securing said overlay to said undercore at predetermined spaced apart locations.

12. The protective shelf of claim 11, wherein the material comprising said undercore is selected from the group consisting of laminated particle board, solid wood, pressed wood and fiber wood.

13. The protective shelf of claim 11, wherein said overlay is comprised of plastic.

14. The protective shelf according to claim 13, wherein the plastic comprising said overlay is high density polyethylene.

15. The protective shelf of claim 11, wherein the top and nose portions of said overlay are of one-piece, integral construction.

16. The protective shelf of claim 11, wherein the nose portion of said overlay extends completely around the front end of said undercore and terminates on the bottom surface adjacent the junction between the front end and bottom surfaces of said undercore.

17. The protective shelf according to claim 16, further including:

a trim piece secured to the bottom surface of said undercore over the terminus of said overlay.

18. The protective shelf according to claim 16, wherein said nose portion is rounded and of constant curvature.

19. The protective shelf according to claim 17, wherein the ribs and grooves extend through both the top portion and nose portion of said undercore.

20. The protective shelf of claim 11, wherein said fastening means includes staples extending through said overlay and into said undercore.

21. In combination with a storage system having interconnected side, top and bottom walls, a protective shelf for use therein, comprising:

a generally rectangular, substantially rigid undercore having top and bottom surfaces, front and back ends, and longitudinal sides;

said undercore being formed from a predetermined solid material;

a substantially semi-rigid cover overlying said undercore, said cover having top and bottom surfaces and being relatively thinner than said undercore;

said cover including a top portion covering the top surface of said undercore and a nose portion covering the front end of said undercore, with alternate longitudinal ribs and grooves therein extending substantially continuously in at least the top portion of said cover;

means for securing said cover to said undercore at predetermined spaced apart locations; and means for fastening said shelf to the side walls of the storage system.

22. The protective shelf of claim 21, wherein the material comprising said undercore is selected from the group consisting of laminated particle board, solid wood, pressed wood and fiber wood.

23. The protective shelf of claim 21, wherein said overlay is comprised of plastic.

24. The protective shelf according to claim 23, wherein the plastic comprising said overlay is high density polyethylene.

25. The protective shelf of claim 21, wherein the nose portion of said overlay extends completely around the front end of said undercore and terminates on the bottom surface adjacent the junction between the front end and bottom surfaces of said undercore.

26. The protective shelf according to claim 25, further including:

a trim piece secured to the bottom surface of said undercore over the terminus of said overlay.

27. The protective shelf according to claim 25, wherein the ribs and grooves extend through both the top portion and nose portion of said undercore.

28. The protective shelf of claim 21, wherein said fastening means is disposed in recesses in the sides of said shelf, between the top and bottom surfaces thereof, so as to be hidden.

* * * * *